United States Patent [19]

Henseler

[11] Patent Number: 5,524,923

[45] Date of Patent: Jun. 11, 1996

[54] INSTRUMENT PANEL FOR A MOTOR VEHICLE

[75] Inventor: Wolfgang Henseler, Herrenberg, Germany

[73] Assignee: Mercedes-Benz AG, Stuttgart, Germany

[21] Appl. No.: 314,651

[22] Filed: Sep. 29, 1994

[30] Foreign Application Priority Data

Sep. 29, 1993 [DE] Germany ............................. 43 33 135.1
May 27, 1994 [DE] Germany ............................. 44 18 583.9

[51] Int. Cl.$^6$ .............................. B60R 21/22; B60H 1/24
[52] U.S. Cl. ...................... 280/728.3; 280/732; 454/152
[58] Field of Search ............................... 280/728 B, 732, 280/752, 728.3; 454/152, 143, 127; 296/70

[56] References Cited

U.S. PATENT DOCUMENTS

| | | | |
|---|---|---|---|
| 3,719,134 | 3/1973 | Korinth | 454/152 |
| 5,072,967 | 12/1991 | Batchelder et al. | 280/732 |
| 5,084,122 | 1/1992 | Fukushima et al. | 280/728 B |
| 5,316,335 | 5/1994 | Gray et al. | 280/728 B |

FOREIGN PATENT DOCUMENTS

| | | | |
|---|---|---|---|
| 1909519 | 10/1964 | Germany | 454/152 |
| 4137926A1 | 5/1992 | Germany | 280/728 B |
| 5-229367 | 9/1993 | Japan | 280/728 B |

*Primary Examiner*—Brian L. Johnson
*Assistant Examiner*—Peter C. English
*Attorney, Agent, or Firm*—Evenson McKeown Edwards & Lenahan

[57] ABSTRACT

An instrument panel for a motor vehicle extends over the width of a passenger compartment in front of a driver's seat and of a passenger seat, and exhibits an outer skin provided with a multiplicity of small through-passages which are distributed at least over a passenger-side region. The outer skin is produced from a temperature-independently dimensionally stable plastic material, and an instrument-panel reinforcement provided beneath the outer skin exhibits a through-passage opening for a passenger airbag in the region of the passenger seat. The through-passages are arranged as perforations which permit the outer skin to be torn open in the region of the through-passage opening, the perforations distributed over the instrument panel being in a pattern adapted to the contours of the through-passage opening such that the potential outlet region of this airbag cannot be detected.

16 Claims, 1 Drawing Sheet

INSTRUMENT PANEL FOR A MOTOR VEHICLE

BACKGROUND AND SUMMARY OF THE INVENTION

The invention relates to an instrument panel for a motor vehicle which extends over the width of a passenger compartment, in front of a driver's seat and of a passenger seat, and which exhibits an outer skin provided with a multiplicity of small through-passages which are distributed at least over a passenger-side region.

Such an instrument panel is known from German Patent Document DE 19 09 519U. The instrument panel in the passenger compartment of a motor vehicle is provided over the entire width of the passenger compartment with a multiplicity of through-passages which serve to channel treated or conditioned air into the passenger compartment. In this arrangement, there is provided, beneath the reinforcement moulding of the instrument panel, a chamber which serves as a distributor space for the treated or conditioned air.

An object of the invention is to provide an instrument panel of the type mentioned above, which is unobtrusive in the region of the passenger seat and makes it possible to provide a passenger airbag cost-effectively.

This object is achieved according to preferred embodiments of the invention in that the outer skin is produced from a temperature-independently dimensionally stable plastic material, in that an instrument-panel reinforcement provided beneath the outer skin exhibits, in the region of the passenger seat, a through-passage opening for a passenger airbag, in that the through-passages are arranged as perforations which permit the outer skin to be torn open in the region of the through-passage opening, and in that the perforations distributed over the instrument panel are in a pattern adapted to the contours of the through-passage opening such that the potential outlet region of the airbag cannot be detected.

Since the through-passages are arranged as perforations on the outer skin, at least over the entire passenger side, a stylistically uniform appearance of the instrument panel is achieved. Perforations merely in the region of the through-passage opening for the passenger airbag, said perforations conspicuously indicating the presence of a passenger airbag, are thus avoided. German Patent Document DE 41 37 926 A1 discloses an instrument panel which is perforated in this manner and in the case of which this stylistically unattractive impression is covered over by a foam panel adhesively bonded onto the instrument panel.

By using the temperature-independently dimensionally stable plastic material, the perforations maintain their geometrical shape even when they are subjected to a pronounced extent to heat or cold, as a result of which the overall aesthetic impression is not changed, Moreover, this consequently ensures an unchanging tear-open characteristic of the outer skin after the passenger airbag has been triggered. The use of liquid slush skins or powder slush skins has proved particularly advantageous. The perforations distributed over the instrument panel are in a pattern adapted to the contours of the through-passage opening. The pattern in the region of the through-passage opening thus continues over the entire width of the instrument panel, as a result of which a uniform, aesthetically pleasing overall impression is given.

In a further development of the invention, the through-passage opening is concealed by a flap which is retained pivotably on the instrument-panel reinforcement, and a soft elastic, energy-absorbing intermediate layer is provided between the instrument-panel reinforcement and the outer skin. The flap prevents the outer skin from collapsing in the region of the through-passage opening. The energy-absorbing intermediate layer offers protection, over the entire width of the instrument panel, against impact injuries for vehicle occupants. This results in a buffer layer in front of the relatively rigid moulding of the instrument-panel reinforcement.

In a further embodiment of the invention, there are provided, in the instrument-panel reinforcement, a plurality of ventilation openings for the rear-side connection of ventilation lines, through which air can be channelled into the passenger compartment via the perforations. The perforations consequently assume an additional function, it being possible, by virtue of the perforations being lined up considerably more closely to one another than in the prior art, to provide very uniform passenger-compartment air conditions.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
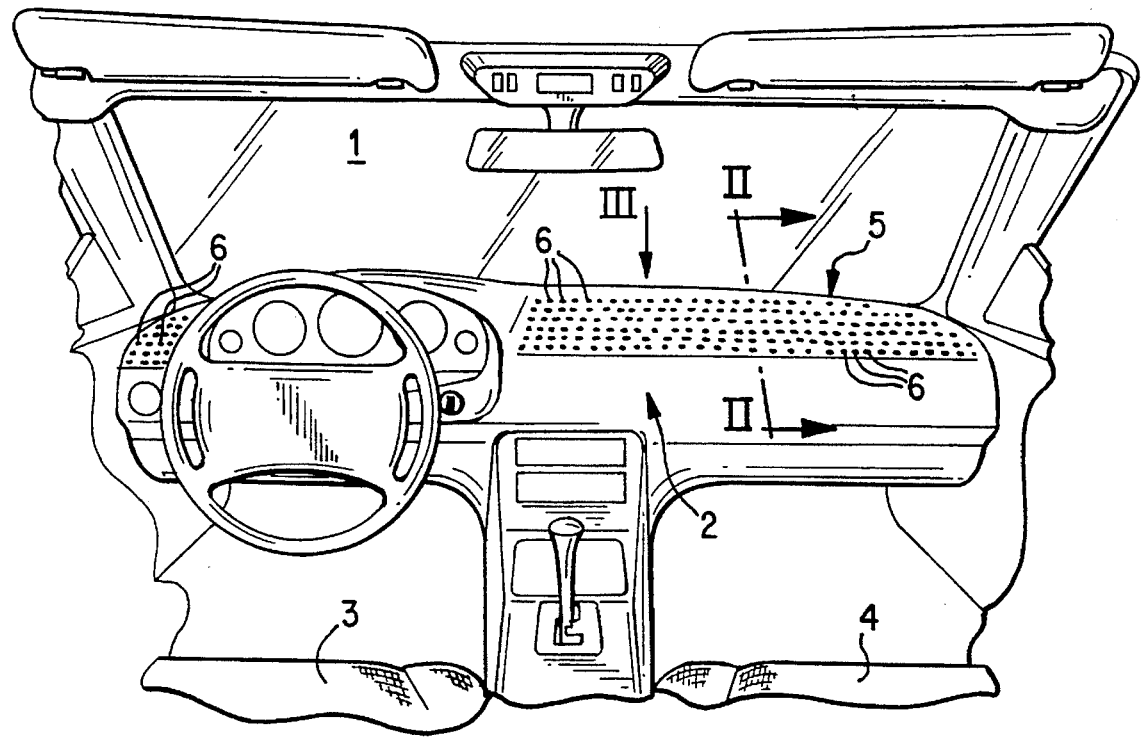
FIG. 1 shows a perspective representation of part of a passenger compartment of a passenger vehicle in the region of an instrument panel which is arranged in front of a driver's seat and of a passenger seat and whose outer skin is provided with small through-passages in the form of perforations, constructed according to a preferred embodiment of the invention.

The motor vehicle according to FIG. 1 exhibits a passenger compartment having a driver's seat 3 and a passenger seat 4, which are represented in schematized manner in each case by a seat cushion. Arranged in front of the driver's seat and of the passenger seat 3, 4, beneath a windscreen, is an instrument panel 2 which extends over the entire width of the passenger compartment.

The instrument panel 2 exhibits a rigid moulding which can be inserted into the passenger compartment and can be connected to parts fixed to the bodywork. The instrument panel 2 exhibits an instrument-panel reinforcement 8 (FIG. 2) which is formed, as a plastic moulding, corresponding to the stylistic and technical requirements for the motor vehicle. Applied onto this instrument-panel reinforcement 8 is a foamed-plastic layer 7 which serves as an intermediate layer and has an energy-absorbing action. Said foamed-plastic layer 7, finally, is coated by an outer skin 5 which is produced from a temperature-independently dimensionally stable plastic material. In the case of the exemplary embodiment, the outer skin comprises a liquid slush skin. In the case of other exemplary embodiments of the invention, powder slush skins are used.

Over the entire width of the passenger compartment, small through-passages 6 which are lined up in the form of perforations are provided such that they are distributed in the outer skin, on the upper side, adjoining the windscreen 1, of the instrument panel 2. Over the entire width of the passenger compartment, the perforations formed by the through-passages 6 represent a uniform, squared pattern, on the outer skin 5.

Figure 3:
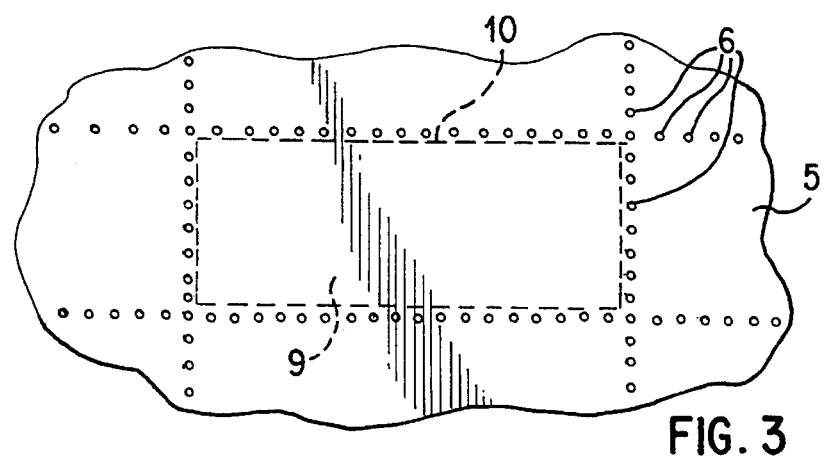
FIG. 3 is an enlarged plan view of the passenger-side region of the instrument panel taken in direction of arrow III in FIG. 1 and schematically showing an embodiment of the invention.

In this arrangement, the pattern is adapted to the contour of a through-passage opening for a passenger-side airbag (FIG. 3). At the level of the passenger seat, there is, in fact, provided, in the upper side of the instrument panel, a through-passage flap 9 which is retained pivotably on the instrument-panel reinforcement 8 by means of a plastic hinge 10. A passenger-side airbag is located behind the through-passage flap 9. In this arrangement, the hinge axis of the plastic hinge 10 extends such that, when the passenger airbag is triggered, the through-passage flap 9 is pivoted open forwards in the direction of travel, towards the windscreen 1. The through-passage flap 9 is of a rectangular shape and is adapted to the size of the passenger airbag such that, when it is triggered, the passenger airbag can be inflated satisfactorily. The perforations formed by means of the through-passages 6 and located in the outer skin 5 run parallel to the contour of the through-passage flap 9, with the result that, when the passenger airbag is triggered, the outer skin 5 is torn open by the through-passage flap 9 forcing upwards.

The square bordering formed by the perforations continues over the entire upper side of the instrument panel 2, this resulting in a uniform pattern on the upper side of the instrument panel 2. In the case of other embodiments of the invention, other patterns are selected which, on the one hand, can serve additionally as ventilation openings for distributing conditioned air in the passenger compartment or, on the other hand, are correspondingly adapted to other shapes of the through-passage flap 9. The governing requirement with all the embodiments is simply that, as required, reliable tearing-open of the outer skin 5 in the region of the through-passage flap 9 is ensured. Since the outer skin 5 and thus, in particular, also the small through-passages 6 maintain their geometrical shape even in the case of pronounced thermal irradiation or frost, tearing-open of the outer skin 5 always remains the same irrespective of temperature.

Figure 2:
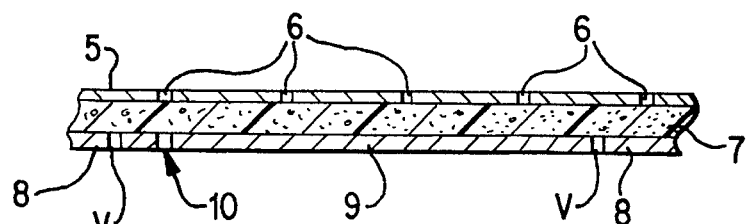
FIG. 2 shows a cross-section through an upper side of the instrument panel, at the level of the passenger seat, along the line II—II of FIG. 1, from which it can be seen that the rigid moulding of the instrument panel is made up of three layers.

FIG. 2 schematically depicts a plurality of ventilation openings V in the instrument panel reinforcement for the rear side connection of ventilation lines through which air can be channelled into the passenger compartment via the perforations 6 in the outer skin 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Instrument panel assembly for a motor vehicle, said instrument panel assembly extending over a vehicle passenger compartment width in front of a driver's seat and a passenger seat, said instrument panel assembly comprising:

an outer skin facing the passenger compartment;

a multiplicity of small air ventilation through-passages in the outer skin which are arranged in a predetermined through-passage pattern, and an airbag accommodating instrument panel reinforcement section disposed under the outer skin between the outer skin and an airbag during a normal in use position on the motor vehicle, said reinforcement section being adapted to be forcibly moved by an expanding airbag to create an airbag through-opening in the instrument panel assembly in the region of the passenger seat, wherein said predetermined through-passage pattern extends over a portion of the outer skin which is larger than and encompasses the periphery of the reinforcement section and the resultant airbag through-opening in the event of an expanding airbag, said through-passage pattern including passages aligned with the periphery of the reinforcement section which form tear-away perforations permitting the outer skin to be torn open in a predetermined pattern to accommodate opening of an airbag and the reinforcement section through the airbag through-opening into said passenger compartment, whereby inflation of the airbag and consequent movement of the airbag accommodating instrument panel reinforcement section and tearing of the outer skin along said through-passages aligned with the periphery of the reinforcement section is facilitated without said outer skin through-passage pattern giving visible indications regarding location of the airbag under said instrument panel assembly.

2. Instrument panel assembly according to claim 1, comprising a soft-energy absorbing intermediate layer provided between the instrument panel reinforcement section and the outer skin.

3. Instrument panel assembly according to claim 2, wherein said instrument panel reinforcement section is pivotably supported at an adjacent section of an instrument panel reinforcement.

4. Instrument panel assembly according to claim 3, comprising a plurality of ventilation openings in an instrument panel reinforcement surrounding the instrument panel reinforcement section for the rear-side connection of ventilation lines through which air can be channelled into the passenger compartment via the ventilation through passages in the outer skin.

5. Instrument panel assembly according to claim 2, comprising a plurality of ventilation openings in an instrument panel reinforcement surrounding the instrument panel reinforcement section for the rear-side connection off ventilation lines through which air can be channelled into the passenger compartment via the ventilation through passages in the outer skin.

6. Instrument panel assembly according to claim 1, wherein the outer skin is produced from a temperature-independently dimensionally stable plastic material.

7. Instrument panel assembly according to claim 6, comprising a soft-energy absorbing intermediate layer provided between the instrument panel reinforcement section and the outer skin.

8. Instrument panel assembly according to claim 7, wherein said instrument panel reinforcement section is pivotably supported at an adjacent section of an instrument panel reinforcement.

9. Instrument panel assembly according to claim 8, comprising a plurality of ventilation openings in an instrument panel reinforcement surrounding the instrument panel reinforcement section for the rear-side connection of ventilation lines through which air can be channelled into the passenger compartment via the ventilation through passages in the outer skin.

10. Instrument panel assembly according to claim 7, comprising a plurality of ventilation openings in an instrument panel reinforcement surrounding the instrument panel reinforcement section for the rear-side connection of ventilation lines through which air can be channelled into the passenger compartment via the ventilation through passages in the outer skin.

11. Instrument panel assembly according to claim 6, wherein said instrument panel reinforcement section is pivotably supported at an adjacent section of an instrument panel reinforcement.

12. Instrument panel assembly according to claim 11, comprising a plurality of ventilation openings in an instrument panel reinforcement surrounding the instrument panel reinforcement section for the rear-side connection of ventilation lines through which air can be channelled into the passenger compartment via the ventilation through passages in the outer skin.

13. Instrument panel assembly according to claim 6, comprising a plurality of ventilation openings in an instrument panel reinforcement surrounding the instrument panel reinforcement section for the rear-side connection of ventilation lines through which air can be channelled into the passenger compartment via the ventilation through passages in the outer skin.

14. Instrument panel assembly according to claim 1, wherein said instrument panel reinforcement section is pivotably supported at an adjacent section of an instrument panel reinforcement.

15. Instrument panel assembly according to claim 14, comprising a plurality of ventilation openings in an instrument panel reinforcement surrounding the instrument panel reinforcement section for the rear-side connection of ventilation lines through which air can be channelled into the passenger compartment via the ventilation through passages in the outer skin.

16. Instrument panel assembly according to claim 1, comprising a plurality of ventilation openings in an instrument panel reinforcement surrounding the instrument panel reinforcement section for the rear-side connection of ventilation lines through which air can be channelled into the passenger compartment via the ventilation through passages in the outer skin.

* * * * *